United States Patent
Evans

(10) Patent No.: US 7,927,397 B1
(45) Date of Patent: Apr. 19, 2011

(54) CONCENTRATED SEPARATOR BY-PRODUCT AND FISH SOLUBLE BY-PRODUCT BASED FERTILIZER

(75) Inventor: Jacob Matthew Evans, Monterey, CA (US)

(73) Assignee: True Organic Products, Inc., Monterey, CA (US)

( * ) Notice: Subject to any disclaimer, the term of this patent is extended or adjusted under 35 U.S.C. 154(b) by 256 days.

(21) Appl. No.: 12/187,043

(22) Filed: Aug. 6, 2008

(51) Int. Cl.
C05F 1/00 (2006.01)
C05F 5/00 (2006.01)

(52) U.S. Cl. ........... 71/16; 71/11; 71/25; 71/64.1
(58) Field of Classification Search ......... 71/11–26, 71/64.1
See application file for complete search history.

(56) References Cited

U.S. PATENT DOCUMENTS

| | | | |
|---|---|---|---|
| 1,501,916 A * | 7/1924 | Nikaido | 71/26 |
| 1,599,185 A | 9/1926 | Reich | |
| 1,631,252 A | 6/1927 | Dickerson | |
| 2,049,524 A * | 8/1936 | Stillwell | 71/26 |
| 2,117,087 A | 5/1938 | Formhals | |
| 2,315,422 A | 3/1943 | Hildebrandt | |
| 2,626,237 A | 1/1953 | Warren | |
| 2,738,264 A * | 3/1956 | Watson | 71/16 |
| 3,445,220 A * | 5/1969 | Anderson | 71/9 |
| 3,983,255 A | 9/1976 | Bass | |
| 4,126,439 A * | 11/1978 | Stekoll | 71/16 |
| 4,230,485 A | 10/1980 | Ohlrogge | |
| 4,424,151 A | 1/1984 | Grealy et al. | |
| 4,604,125 A * | 8/1986 | Robertiello et al. | 71/26 |
| 4,743,287 A * | 5/1988 | Robinson | 71/12 |
| 4,997,469 A * | 3/1991 | Moore | 71/11 |
| 5,631,001 A | 5/1997 | Harich et al. | |
| 5,772,721 A * | 6/1998 | Kazemzadeh | 71/11 |
| 6,083,293 A | 7/2000 | Bath | |
| 6,174,472 B1 * | 1/2001 | Johnson et al. | 264/118 |
| 6,318,023 B1 | 11/2001 | Yamashita | |
| 6,352,569 B1 | 3/2002 | Beran et al. | |
| 6,524,600 B2 | 2/2003 | Yamashita | |
| 6,572,669 B1 | 6/2003 | Creech | |
| 6,602,824 B1 | 8/2003 | Miles et al. | |
| 7,018,669 B2 | 3/2006 | Kosaka et al. | |

(Continued)

FOREIGN PATENT DOCUMENTS

GB 663133 12/1951

(Continued)

OTHER PUBLICATIONS

Evans, "Concentrated Separator By-Product Based Fertilizer", U.S. Appl. No. 11/670,364, filed Feb. 1, 2007.

(Continued)

*Primary Examiner* — Wayne Langel

(74) *Attorney, Agent, or Firm* — Gunnison, McKay & Hodgson, L.L.P.; Philip McKay

(57) ABSTRACT

A concentrated separator by-product and fish soluble by-product based fertilizer product is created by mixing concentrated separator by-product, a by-product of the de-sugaring of beet molasses, and fish soluble by-product, a by-product of the production of fish meal. The raw mixture of concentrated separator by-product and fish soluble by-product is then heat treated and optionally filtered to remove suspended particular matter. The heat treated mixture of concentrated separator by-product and fish soluble by-product is then cooled to yield the concentrated separator by-product and fish soluble by-product based fertilizer product.

39 Claims, 1 Drawing Sheet

U.S. PATENT DOCUMENTS

| | | |
|---|---|---|
| 7,045,165 B2 | 5/2006 | Westberg |
| 7,074,251 B1 | 7/2006 | Rogers et al. |
| 2003/0066322 A1* | 4/2003 | Perriello ............................ 71/24 |
| 2003/0172697 A1* | 9/2003 | Sower ................................ 71/11 |
| 2004/0062832 A1 | 4/2004 | Kemp |
| 2004/0065127 A1 | 4/2004 | Connell |
| 2006/0243009 A1 | 11/2006 | Burnham |
| 2006/0254331 A1 | 11/2006 | Burnham |
| 2007/0261451 A1* | 11/2007 | Beckley et al. ................... 71/11 |

FOREIGN PATENT DOCUMENTS

| | | | |
|---|---|---|---|
| JP | 63-107907 | * | 5/1988 |
| JP | 2004-168614 A | | 6/2004 |

OTHER PUBLICATIONS

Evans, Analytical Data, 2004-2006.

Kearney et al., "Raw Juice Chromatographic Separation Process", *Proceedings from the 28th Biennial ASSBT Meeting*, Operations, New Orleans, LA, Mar. 8-11, 1995, Amalgamated Research, Inc., pp. 1-5.

Midwest AGRI Commodities, "Raffinate (Desugared Beet Molasses)", Jul. 10, 2001, 1 page.

Wiedmeier et al., "Effects of Concentrated Separator Dried Beet Pulp on Nutrient Digestibility, Milk Production, and Preference of Holstein Cattle", *Journal of Dairy Science*, 1994, vol. 77, No. 10, pp. 3051-3057.

* cited by examiner

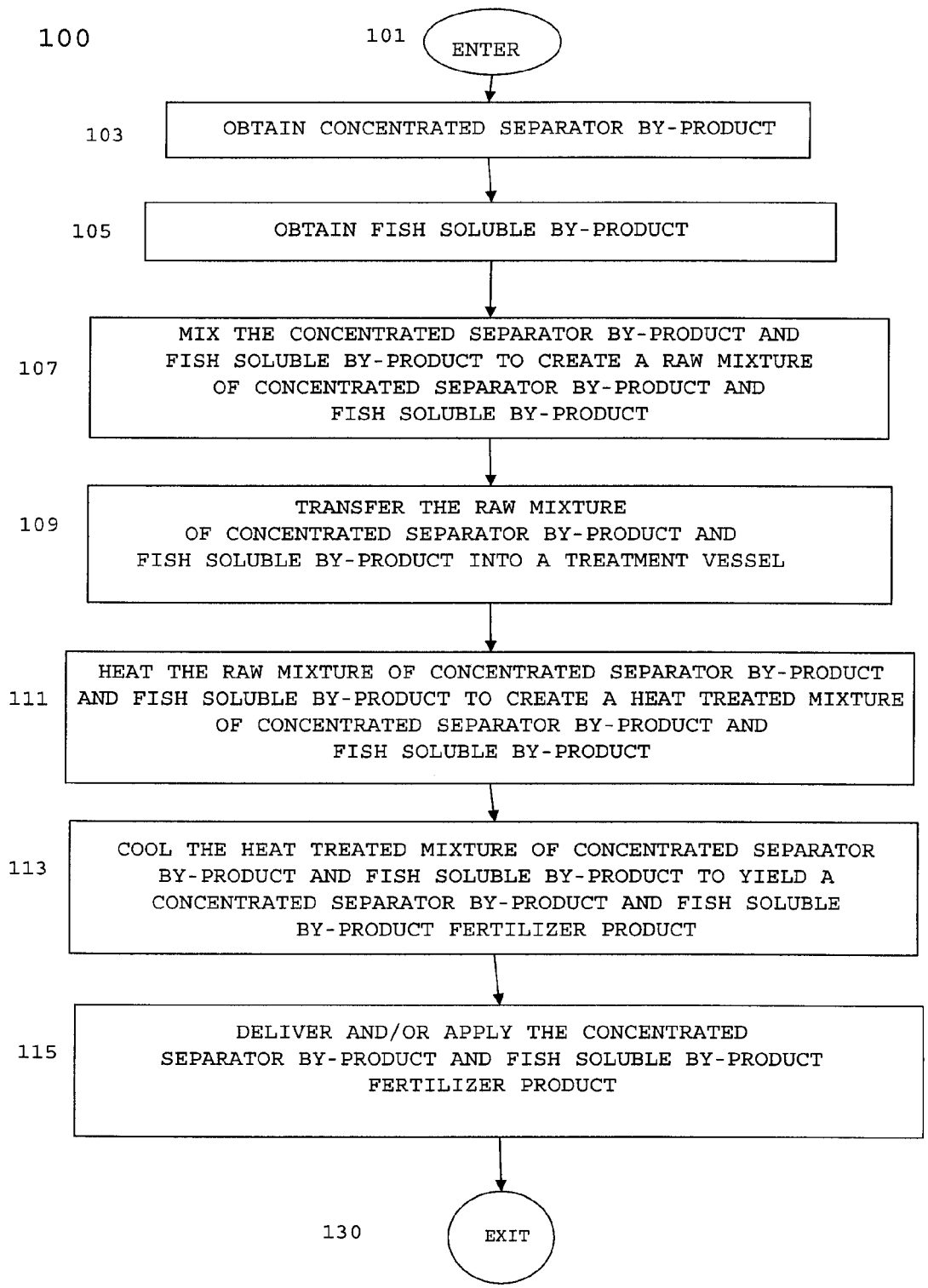

CONCENTRATED SEPARATOR BY-PRODUCT AND FISH SOLUBLE BY-PRODUCT BASED FERTILIZER

BACKGROUND

Over the years, a number of different types of fertilizer compositions have been developed and employed in agriculture. In the recent past, synthetic chemical fertilizer compositions dominated the fertilizer marketplace. However, more recently, there has been increasing public awareness of, and concern regarding, the potential link between synthetic chemical fertilizer use and human disease and/or poisoning. Consequently, there has been a significant movement toward "organic" fertilizer compositions which do not rely on synthetic chemicals and which are typically derived from natural sources.

As a result of the increased demand for organic fertilizer compositions, there is significant interest in the development of new and/or better organic fertilizer compositions that provide the desirable and/or necessary nutrients, but that reduce the risk of introducing pathogens into the food supply.

The desirable nutrients include, but are not limited to, bioavailable phosphorous, potassium and nitrogen. These nutrients must not only be present, but they must be present in sufficient concentrations to be beneficial to agricultural vegetation. In addition, the organic fertilizer compositions must be in a form that is readily applied to the agricultural vegetation and/or has minimum impact on the surrounding community. To this end, the desirable characteristics of organic fertilizer compositions include, but are not limited to: the ability to directly apply the organic fertilizer compositions in a low viscosity liquid form; the ability to inject and/or add the organic fertilizer compositions into irrigation streams; time-released nitrogen components which become bioavailable to agricultural vegetation by beneficial microbial digestion in soil; the elimination of chemical crop burning; minimal odor associated with the organic fertilizer composition during and/or after application; and the minimization of undesirable run-off situations.

In an effort to find a cost-efficient organic fertilizer composition, numerous attempts have been made to utilize waste products generated by fermentation and/or refined sugar processing as an organic fertilizer composition. These attempts have included deriving organic fertilizer compositions from malt extracts and/or spent grain liquor; treating molasses to recover potash and nitrogen in solid form for use as an organic fertilizer composition; deriving organic fertilizer compositions from commercially available molasses; deriving thixotrophic fertilizer compositions from organic materials including molasses; and deriving organic fertilizer compositions from yeast/black strap molasses. However, these organic fertilizer compositions typically lack the requisite concentrations of nutrients to be beneficial to agricultural vegetation.

Some efforts to "boost" the concentrations of nutrients in these waste by-product based organic fertilizer compositions require significant chemical processing and/or the addition of synthetically derived chemicals. However, this approach often defeated the original goal of developing an "organic" fertilizer composition, and in many cases proved too costly to be economically feasible. In other cases, attempts have been made to add relatively organic materials to the waste product based organic fertilizer compositions such as enzyme digested fish or "liquid fish". However, enzyme digested fish is created by adding an enzyme that virtually "dissolves" the fish into a enzyme digested fish solution. Since the fish is composed of mostly water to start with, the resultant enzyme digested fish solution is also mostly water, typically 80% or more water. As a result, the concentrations of desirable nutrients, particularly nitrogen, are still very low. In addition, the enzyme digested fish solution, and virtually any fertilizer utilizing the enzyme digested fish solution, has an extremely strong, and unpleasant, odor. Consequently, the use of any fertilizer utilizing the enzyme digested fish solution is often restricted to areas far removed from human communities. However, with the encroachment of human communities on virtually all farm lands throughout the world, farming locations sufficiently removed from human communities to allow non-problematic use the enzyme digested fish solution are becoming rarer and rarer.

As a result, there is a current need for an environmentally benign fertilizer derived from a natural organic source which provides sufficient levels of usable nutrients but does not require significant processing and does not raise environmental concerns.

SUMMARY

In accordance with one embodiment, a process for production of a concentrated separator by-product and fish soluble by-product based fertilizer product is created by mixing concentrated separator by-product, a by-product of the de-sugaring of beet molasses, and fish soluble by-product, a by-product of the production of fish meal. In one embodiment, the raw mixture of concentrated separator by-product and fish soluble by-product is then heat treated and, in one embodiment, optionally filtered to remove suspended particular matter. In one embodiment, the heat treated mixture of concentrated separator by-product and fish soluble by-product is then cooled to yield the concentrated separator by-product and fish soluble by-product based fertilizer product. In one embodiment, the concentrated separator by-product and fish soluble by-product based fertilizer product is then applied to agricultural vegetation, either directly or by inclusion in an irrigation stream.

In one embodiment, a quantity of concentrated separator by-product, also referred to herein as CSB, is obtained. Concentrated separator by-product is a by-product of the de-sugaring of beet molasses and is therefore typically readily available.

In one embodiment, fish soluble by-product is then obtained. Fish soluble by-product is a viscous liquid by-product from the production of fish meal. Consequently, fish soluble by-product is also typically readily available.

In one embodiment, the fish soluble by-product is mixed with the concentrated separator by-product such that the resulting raw mixture of concentrated separator by-product and fish soluble by-product is 70% to 80% concentrated separator by-product and 30% to 20% fish soluble by-product. In one embodiment, the fish soluble by-product is added to the concentrated separator by-product such that the resulting raw mixture of concentrated separator by-product and fish soluble by-product is 40% to 60% concentrated separator by-product and 60% to 40% fish soluble by-product. In other embodiments, the fish soluble by-product is added to the concentrated separator by-product such that the resulting raw mixture of concentrated separator by-product and fish soluble by-product is any desired percentage concentration of fish soluble by-product.

In one embodiment, the raw mixture of concentrated separator by-product and fish soluble by-product is then heat treated. In one embodiment, the heat treatment is performed in a range of about 150 to 200 degrees Fahrenheit (F.) for about 24 to 96 hours.

In one embodiment, the heat treated concentrated separator by-product and fish soluble by-product is filtered to remove suspended particular matter. In one embodiment, filtration is provided using a wire mesh size in a range of 50 to 200.

In one embodiment, the heat treated mixture of concentrated separator by-product and fish soluble by-product is then cooled to yield the concentrated separator by-product and fish soluble by-product based fertilizer product.

In one embodiment, the concentrated separator by-product and fish soluble by-product based fertilizer product is then applied to fields of agricultural vegetation in quantities in the approximate range of 25 to 200 gallons per acre. In one embodiment, the concentrated separator by-product and fish soluble by-product based fertilizer product disclosed herein is applied to the fields of agricultural vegetation either directly or by inclusion in an irrigation stream.

Using the process for production of a concentrated separator by-product and fish soluble by-product based fertilizer product disclosed herein, a concentrated separator by-product and fish soluble by-product based fertilizer product is provided that: is environmentally benign; is non-pathogenic; is derived from a natural organic source; does not require significant processing; has minimal odor; has a low viscosity liquid form; can be applied directly to agricultural vegetation; can be injected and/or added to irrigation streams; includes time-released nitrogen components which become bioavailable to agricultural vegetation by beneficial microbial digestion in soil; and eliminates chemical crop burning.

As discussed in more detail below, using the below embodiments, with little or no modification and/or user input, there is considerable flexibility, adaptability, and opportunity for customization to meet the specific needs of various users under numerous circumstances.

BRIEF DESCRIPTION OF THE DRAWINGS

The FIGURE is a flow chart of a process for creating a concentrated separator by-product and fish soluble by-product based fertilizer product in accordance with one embodiment.

Common reference numerals are used throughout the FIGURE and the detailed description to indicate like elements. One skilled in the art will readily recognize that the FIGURE is an example and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIGURE, which depicts one exemplary embodiment. Embodiments may be embodied in many different forms and should not be construed as limited to the embodiments set forth herein, shown in the FIGURE, and/or described below. Rather, these exemplary embodiments are provided to allow a complete disclosure that conveys the principles of the invention, as set forth in the claims, to those of skill in the art.

In accordance with one embodiment, a process for production of a concentrated separator by-product and fish soluble by-product based fertilizer product is created by mixing concentrated separator by-product, a by-product of the de-sugaring of beet molasses, and fish soluble by-product, a by-product of the production of fish meal. In one embodiment, the raw mixture of concentrated separator by-product and fish soluble by-product is then heat treated and, in one embodiment, optionally filtered to remove suspended particular matter. In one embodiment, the heat treated mixture of concentrated separator by-product and fish soluble by-product is then cooled to yield the concentrated separator by-product and fish soluble by-product based fertilizer product. In one embodiment, the concentrated separator by-product and fish soluble by-product based fertilizer product is then applied to agricultural vegetation, either directly or by inclusion in an irrigation stream.

The FIGURE is a flow chart of a process for production of a concentrated separator by-product and fish soluble by-product based fertilizer product 100 in accordance with one embodiment. As show in the FIGURE, process for production of a concentrated separator by-product and fish soluble by-product based fertilizer product 100 begins at enter operation 101 and process flow proceeds to OBTAIN CONCENTRATED SEPARATOR BY-PRODUCT OPERATION 103.

In one embodiment, at OBTAIN CONCENTRATED SEPARATOR BY-PRODUCT OPERATION 103 a quantity of concentrated separator by-product is obtained.

Concentrated separator by-product is a by-product of the de-sugaring of beet molasses and therefore is readily available. Currently, concentrated separator by-product is commonly used as a supplement in ruminant feedstock.

To provide some background, historically, concentrated separator by-product has not been considered to be useful as a direct application organic fertilizer due to the historically low concentrations of essential nutrients remaining in the concentrated separator by-product after the molasses de-sugaring process. However, the processing efficiency of sugar refineries has recently been improved by the advent of chromatographic extraction techniques. The improved chromatographic extraction techniques have also improved the nutrient concentrations in the raffinate. For purposes of this specification, the term raffinate is the residual liquid resulting from the de-sugaring of beet molasses.

A discussion of the improved chromatographic separation process currently practiced by many sugar refiners is provided in "Raw Juice Chromatographic Separation Process" published in the Proceedings from the 28th Biennial ASSBT Meeting, Operations, New Orleans, La., Mar. 8-11, 1995, by Kearney, Kochergin, Petersen, Velasquez and Jacob of Amalgamated Research Inc.

In light of the conventional wisdom regarding concentrated separator by-product nutrient concentrations, and long standing practices in the art, the instant Inventor contemplated mixing enzyme digested fish or "liquid fish" with the concentrated separator by-product. However, enzyme digested fish is created by adding an enzyme that virtually "dissolves" the fish into an enzyme digested fish solution. Since the fish is composed of mostly water to start with, the resultant enzyme digested fish solution is also mostly water, typically 80% or more. As a result, the concentrations of desirable nutrients, particularly nitrogen, are still very low. Therefore, the Inventor concluded that concentrated separator by-product and enzyme digested fish solution still had insufficient concentrations of desirable nutrients. In addition, the enzyme digested fish solution, and virtually any fertilizer utilizing the enzyme digested fish solution, has an extremely strong, and unpleasant, odor. Consequently, the use of any fertilizer utilizing the enzyme digested fish solution is often restricted to areas far removed from human communities. However, with the encroachment of human communities on virtually all farm lands throughout the world, farming locations sufficiently removed from human communities to use the enzyme digested fish solution are becoming rarer and rarer.

Seeking an alternative to supplementing the concentrated separator by-product with enzyme digested fish solution, and/or other undesirable and/or ineffective ingredients, to create a concentrated separator by-product based fertilizer product, the present Inventor discovered that, contrary to conventional wisdom and practice in the art, heat-treating the concentrated separator by-product denatures the heat liable vegetable proteins contained in the concentrated separator by-product sufficiently to allow additional nitrogen to become bioavailable. Likewise, phosphorous apparently becomes more available as vegetative nucleosides are broken down by both the original de-sugaring process and the added heat-treatment process.

To his surprise, the present Inventor discovered that the heat treatment of the concentrated separator by-product resulted in a concentrated separator by-product based fertilizer product having significantly increased bioavailable nitrogen, potassium and phosphorous in a readily pumpable, or low viscosity, fluid state. These surprising and unexpected results are shown as analytical concentrations of key nutrients in Table 1 below.

TABLE 1

Range of Nutrients in CSB (By weight)

| Parameter | Range | Average |
|---|---|---|
| Dry matter | 50-75% | 65.0% |
| Nitrogen (N) | 1.4-3.0% | 2.4% |
| Phosphate (P) | 0.02-0.14% | 0.06% |
| Potash (K) | 9.0-11.8% | 10.8% |
| pH | 7.2-9.9 | 8.4 |

The range of nitrogen values was determined by multiplying crude protein fractions by 6.25 as is known in the art, for instance see U.S. Pat. No. 4,424,151 to Grealy et al.

In one embodiment, natural proteases are added to the concentrated separator by-product in lieu of, or in conjunction with, the heat treatment described above; however, the addition of the natural proteases can increase production costs and also potentially allow pathogens to remain in the concentrated separator by-product based fertilizer product if heat treatment is not provided.

While the heat treated concentrated separator by-product based fertilizer product does exhibit the increased levels of desirable nutrients shown above, the instant Inventor continued to research ways to further boost the levels of desirable nutrients. To this end, the instant Inventor again contemplated mixing enzyme digested fish with the now heat treated concentrated separator by-product. However, the gains in concentration of desirable nutrients, particularly nitrogen, were still very low and there was still the problem of an extremely strong, and unpleasant, odor. However, as discussed below, the instant Inventor did not give up, and eventually came upon the process described herein, whereby fish soluble by-products of the fish meal industry are used to supplement the heat treated concentrated separator by-product based fertilizer product.

Returning to the FIGURE, once a quantity of concentrated separator by-product is obtained at OBTAIN CONCENTRATED SEPARATOR BY-PRODUCT OPERATION 103, process flow proceeds to OBTAIN FISH SOLUBLE BY-PRODUCT OPERATION 105.

In one embodiment, at OBTAIN FISH SOLUBLE BY-PRODUCT OPERATION 105 fish soluble by-product is obtained.

As noted above, fish soluble by-product is a viscous liquid by-product from the production of fish meal. Consequently, fish soluble by-product is also readily available.

Typically, and unlike enzyme digested fish solutions, fish soluble by-product contains relatively little water since the water is evaporated off in the process of making the fish meal, and the fish soluble by-product of the fish meal. In addition, as the instant Inventor has discovered, fish soluble by-product has the ability to boost desirable nutrient levels, including nitrogen levels, of heat treated concentrated separator by-product. In addition, fish soluble by-product does not have the strong odor associated with enzyme digested fish solutions, or at least not as strong an odor.

In one embodiment, once fish soluble by-product is obtained at OBTAIN FISH SOLUBLE BY-PRODUCT OPERATION 105, process flow proceeds to MIX THE CONCENTRATED SEPARATOR BY-PRODUCT AND FISH SOLUBLE BY-PRODUCT TO CREATE A RAW MIXTURE OF CONCENTRATED SEPARATOR BY-PRODUCT AND FISH SOLUBLE BY-PRODUCT OPERATION 107.

In one embodiment, at MIX THE CONCENTRATED SEPARATOR BY-PRODUCT AND FISH SOLUBLE BY-PRODUCT TO CREATE A RAW MIXTURE OF CONCENTRATED SEPARATOR BY-PRODUCT AND FISH SOLUBLE BY-PRODUCT OPERATION 107 the fish soluble by-product is mixed with the concentrated separator by-product.

In one embodiment, at MIX THE CONCENTRATED SEPARATOR BY-PRODUCT AND FISH SOLUBLE BY-PRODUCT TO CREATE A RAW MIXTURE OF CONCENTRATED SEPARATOR BY-PRODUCT AND FISH SOLUBLE BY-PRODUCT OPERATION 107 the fish soluble by-product is mixed with the concentrated separator by-product such that the resulting raw mixture of concentrated separator by-product and fish soluble by-product is 70% to 80% concentrated separator by-product and 30% to 20% fish soluble by-product.

In one embodiment, at MIX THE CONCENTRATED SEPARATOR BY-PRODUCT AND FISH SOLUBLE BY-PRODUCT TO CREATE A RAW MIXTURE OF CONCENTRATED SEPARATOR BY-PRODUCT AND FISH SOLUBLE BY-PRODUCT OPERATION the fish soluble by-product is mixed with the concentrated separator by-product such that the resulting raw mixture of concentrated separator by-product and fish soluble by-product is 40% to 60% concentrated separator by-product and 60% to 40% fish soluble by-product.

In other embodiments, at MIX THE CONCENTRATED SEPARATOR BY-PRODUCT AND FISH SOLUBLE BY-PRODUCT TO CREATE A RAW MIXTURE OF CONCENTRATED SEPARATOR BY-PRODUCT AND FISH SOLUBLE BY-PRODUCT OPERATION 107 the fish soluble by-product is mixed with the concentrated separator by-product such that the resulting raw mixture of concentrated separator by-product and fish soluble by-product is any desired percentage concentration of fish soluble by-product, typically as determined by cost and the specific needs of the user.

In one embodiment, once the fish soluble by-product is mixed with the concentrated separator by-product at MIX THE CONCENTRATED SEPARATOR BY-PRODUCT AND FISH SOLUBLE BY-PRODUCT TO CREATE A RAW MIXTURE OF CONCENTRATED SEPARATOR BY- PRODUCT AND FISH SOLUBLE BY-PRODUCT OPERATION 107 to create a raw mixture of concentrated separator by-product and fish soluble by-product, process flow proceeds to TRANSFER THE RAW MIXTURE OF CONCENTRATED SEPARATOR BY-PRODUCT AND FISH SOLUBLE BY-PRODUCT INTO A TREATMENT VESSEL OPERATION 109.

In one embodiment, at TRANSFER THE RAW MIXTURE OF CONCENTRATED SEPARATOR BY-PRODUCT AND FISH SOLUBLE BY-PRODUCT INTO A TREATMENT VESSEL OPERATION 109 the raw mixture of concentrated separator by-product and fish soluble by-product is placed in a treatment vessel.

In one embodiment, at TRANSFER THE RAW MIXTURE OF CONCENTRATED SEPARATOR BY-PRODUCT AND FISH SOLUBLE BY-PRODUCT INTO A TREATMENT VESSEL OPERATION 109 the raw mixture of concentrated separator by-product and fish soluble by-product is filtered as the raw mixture of concentrated separator by-product and fish soluble by-product is being disposed into the treatment vessel. In one embodiment, this filtering is optional, as the amount of suspended particular matter has been found to be minimal. If pre-treatment filtration is desired, a stainless steel, or other suitable material, mesh having a mesh size number between 50 and 200 may be employed. In one embodiment, the mesh size is 100.

In one embodiment, the treatment vessel of TRANSFER THE RAW MIXTURE OF CONCENTRATED SEPARATOR BY-PRODUCT AND FISH SOLUBLE BY-PRODUCT INTO A TREATMENT VESSEL OPERATION 109 is an insulated stainless steel tank having electrically powered heat strips applied thereto. However, the tank construction and heating mechanism are not critical to the treatment process. For example, in one embodiment, at TRANSFER THE RAW MIXTURE OF CONCENTRATED SEPARATOR BY-PRODUCT AND FISH SOLUBLE BY-PRODUCT INTO A TREATMENT VESSEL OPERATION 109 the treatment vessel is a carbon steel tank which is heated by steam supplied by a package boiler or cogeneration facility. Moreover, the slightly basic pH of the mixture of concentrated separator by-product and fish soluble by-product is not considered particularly corrosive to the metals commonly used in the construction of metal treatment vessels. One skilled in the art will appreciate that other non-metallic treatment vessels may be employed as well at TRANSFER THE RAW MIXTURE OF CONCENTRATED SEPARATOR BY-PRODUCT AND FISH SOLUBLE BY-PRODUCT INTO A TREATMENT VESSEL OPERATION 109.

In one embodiment, once the raw mixture of concentrated separator by-product and fish soluble by-product is placed in a treatment vessel at TRANSFER THE RAW MIXTURE OF CONCENTRATED SEPARATOR BY-PRODUCT AND FISH SOLUBLE BY-PRODUCT INTO A TREATMENT VESSEL OPERATION 109, process flow proceeds to HEAT THE RAW MIXTURE OF CONCENTRATED SEPARATOR BY-PRODUCT AND FISH SOLUBLE BY-PRODUCT TO CREATE A HEAT TREATED MIXTURE OF CONCENTRATED SEPARATOR BY-PRODUCT AND FISH SOLUBLE BY-PRODUCT OPERATION 111.

In one embodiment, at HEAT THE RAW MIXTURE OF CONCENTRATED SEPARATOR BY-PRODUCT AND FISH SOLUBLE BY-PRODUCT TO CREATE A HEAT TREATED MIXTURE OF CONCENTRATED SEPARATOR BY-PRODUCT AND FISH SOLUBLE BY-PRODUCT OPERATION 111 the raw mixture of concentrated separator by-product and fish soluble by-product of MIX THE CONCENTRATED SEPARATOR BY-PRODUCT AND FISH SOLUBLE BY-PRODUCT TO CREATE A RAW MIXTURE OF CONCENTRATED SEPARATOR BY-PRODUCT AND FISH SOLUBLE BY-PRODUCT OPERATION 107 is mechanically heated.

In one embodiment, at HEAT THE RAW MIXTURE OF CONCENTRATED SEPARATOR BY-PRODUCT AND FISH SOLUBLE BY-PRODUCT TO CREATE A HEAT TREATED MIXTURE OF CONCENTRATED SEPARATOR BY-PRODUCT AND FISH SOLUBLE BY-PRODUCT OPERATION 111 heat is applied to the raw mixture of concentrated separator by-product and fish soluble by-product in order to raise the average temperature of the raw mixture of concentrated separator by-product and fish soluble by-product to, in one embodiment, at least 150 degrees F.

In one embodiment, at HEAT THE RAW MIXTURE OF CONCENTRATED SEPARATOR BY-PRODUCT AND FISH SOLUBLE BY-PRODUCT TO CREATE A HEAT TREATED MIXTURE OF CONCENTRATED SEPARATOR BY-PRODUCT AND FISH SOLUBLE BY-PRODUCT OPERATION 111 heat is added until the average temperature of the raw mixture of concentrated separator by-product and fish soluble by-product is raised to approximately 200 degrees F. or more. This temperature range is known to inhibit pathogenic bacterial growth of the most common pathogens such as *Escherichia coli* O157:H7 and *Salmonella*.

In one embodiment, at HEAT THE RAW MIXTURE OF CONCENTRATED SEPARATOR BY-PRODUCT AND FISH SOLUBLE BY-PRODUCT TO CREATE A HEAT TREATED MIXTURE OF CONCENTRATED SEPARATOR BY-PRODUCT AND FISH SOLUBLE BY-PRODUCT OPERATION 111 the raw mixture of concentrated separator by-product and fish soluble by-product is pre-treated with proteolytic enzymes to further break down the vegetable proteins contained in the raw mixture of concentrated separator by-product and fish soluble by-product before the heat treatment is performed. The quantity of proteolytic enzymes to be included, and the length of treatment, will vary from application-to-application, according to the needs of the user.

In one embodiment, at HEAT THE RAW MIXTURE OF CONCENTRATED SEPARATOR BY-PRODUCT AND FISH SOLUBLE BY-PRODUCT TO CREATE A HEAT TREATED MIXTURE OF CONCENTRATED SEPARATOR BY-PRODUCT AND FISH SOLUBLE BY-PRODUCT OPERATION 111 the proteolytic enzyme treatment may also be performed in conjunction with a slow heating of the raw mixture of concentrated separator by-product and fish soluble by-product. In one embodiment, once the average temperature of the raw mixture of concentrated separator by-product and fish soluble by-product exceeds about 150 degrees F., the proteolytic enzymes are denatured and become part of the fertilizer solution.

In one embodiment, at HEAT THE RAW MIXTURE OF CONCENTRATED SEPARATOR BY-PRODUCT AND FISH SOLUBLE BY-PRODUCT TO CREATE A HEAT TREATED MIXTURE OF CONCENTRATED SEPARATOR BY-PRODUCT AND FISH SOLUBLE BY-PRODUCT OPERATION 111 the mixture of concentrated separator by-product and fish soluble by-product is maintained in the treatment vessel at or above 150 degrees F. for at least 24 hours to ensure uniform heat transfer to the mixture of concentrated separator by-product and fish soluble by-product. In one embodiment, to aid in uniform heat transfer, an agitator or pumped recirculation flow may be employed at APPLY HEAT THE RAW MIXTURE OF CONCENTRATED SEPARATOR BY-PRODUCT AND FISH SOLUBLE BY-PRODUCT TO CREATE A HEAT TREATED MIXTURE OF CONCENTRATED SEPARATOR BY-PRODUCT AND FISH SOLUBLE BY-PRODUCT OPERATION 111 as part of the treatment process. In one embodiment, if an agitator or pumped recirculation flow is used to maintain the uniform heat treatment, filtration may also be accomplished concurrently at APPLY HEAT THE RAW MIXTURE OF CONCENTRATED SEPARATOR BY-PRODUCT AND FISH SOLUBLE BY-PRODUCT TO CREATE A HEAT TREATED MIXTURE OF CONCENTRATED SEPARATOR BY-PRODUCT AND FISH SOLUBLE BY-PRODUCT OPERATION 111 by placement of a suitable filter screen as discussed above, into the recirculation flow path. In one embodiment, the heat treatment of APPLY HEAT THE RAW MIXTURE OF CONCENTRATED SEPARATOR BY-PRODUCT AND FISH SOLUBLE BY-PRODUCT TO CREATE A HEAT TREATED MIXTURE OF CONCENTRATED SEPARATOR BY-PRODUCT AND FISH SOLUBLE BY-PRODUCT OPERATION 111 may be performed for 96 hours or more, if desired. However, for energy conservation reasons 24 to 48 hours of heat treatment is believed to be adequate.

In one embodiment, water may be blended with the heat treated mixture of concentrated separator by-product and fish soluble by-product at APPLY HEAT THE RAW MIXTURE OF CONCENTRATED SEPARATOR BY-PRODUCT AND FISH SOLUBLE BY-PRODUCT TO CREATE A HEAT TREATED MIXTURE OF CONCENTRATED SEPARATOR BY-PRODUCT AND FISH SOLUBLE BY-PRODUCT OPERATION 111 to reduce the specific gravity to a range of about 1.2 to 1.6. In one embodiment, water may also be used to recover losses due to evaporation during the heat treatment process of APPLY HEAT THE RAW MIXTURE OF CONCENTRATED SEPARATOR BY-PRODUCT AND FISH SOLUBLE BY-PRODUCT TO CREATE A HEAT TREATED MIXTURE OF CONCENTRATED SEPARATOR BY-PRODUCT AND FISH SOLUBLE BY-PRODUCT OPERATION 111. However, water blending is typically not required, but is rather an optional procedure.

Maintaining the specific gravity of the heat treated mixture of concentrated separator by-product and fish soluble by-product to a specific gravity range of about 1.2 to 1.6 allows a broad range of existing agricultural transfer pumps to be used to distribute the resulting concentrated separator by-product and fish soluble by-product based fertilizer product and greatly simplifies the application of the resulting concentrated separator by-product and fish soluble by-product based fertilizer product to agricultural vegetation.

In one embodiment, once the raw mixture of concentrated separator by-product and fish soluble by-product of MIX THE CONCENTRATED SEPARATOR BY-PRODUCT AND FISH SOLUBLE BY-PRODUCT TO CREATE A RAW MIXTURE OF CONCENTRATED SEPARATOR BY-PRODUCT AND FISH SOLUBLE BY-PRODUCT OPERATION 107 is heat treated in the treatment vessel of TRANSFER THE RAW MIXTURE OF CONCENTRATED SEPARATOR BY-PRODUCT AND FISH SOLUBLE BY-PRODUCT INTO A TREATMENT VESSEL OPERATION 109 at HEAT THE RAW MIXTURE OF CONCENTRATED SEPARATOR BY-PRODUCT AND FISH SOLUBLE BY-PRODUCT TO CREATE A HEAT TREATED MIXTURE OF CONCENTRATED SEPARATOR BY-PRODUCT AND FISH SOLUBLE BY-PRODUCT OPERATION 111 to create a heat treated mixture of concentrated separator by-product and fish soluble by-product, process flow proceeds to COOL THE HEAT TREATED MIXTURE OF CONCENTRATED SEPARATOR BY-PRODUCT AND FISH SOLUBLE BY-PRODUCT TO YIELD A CONCENTRATED SEPARATOR BY-PRODUCT AND FISH SOLUBLE BY-PRODUCT FERTILIZER PRODUCT OPERATION 113.

In one embodiment, at COOL THE HEAT TREATED MIXTURE OF CONCENTRATED SEPARATOR BY-PRODUCT AND FISH SOLUBLE BY-PRODUCT TO YIELD A CONCENTRATED SEPARATOR BY-PRODUCT AND FISH SOLUBLE BY-PRODUCT FERTILIZER PRODUCT OPERATION 113 the heat treated mixture of concentrated separator by-product and fish soluble by-product of HEAT THE RAW MIXTURE OF CONCENTRATED SEPARATOR BY-PRODUCT AND FISH SOLUBLE BY-PRODUCT TO CREATE A HEAT TREATED MIXTURE OF CONCENTRATED SEPARATOR BY-PRODUCT AND FISH SOLUBLE BY-PRODUCT OPERATION 111 is allowed to cool in the treatment vessel of TRANSFER THE RAW MIXTURE OF CONCENTRATED SEPARATOR BY-PRODUCT AND FISH SOLUBLE BY-PRODUCT INTO A TREATMENT VESSEL OPERATION 109.

As noted, in one embodiment, the cooling at COOL THE HEAT TREATED MIXTURE OF CONCENTRATED SEPARATOR BY-PRODUCT AND FISH SOLUBLE BY-PRODUCT TO YIELD A CONCENTRATED SEPARATOR BY-PRODUCT AND FISH SOLUBLE BY-PRODUCT FERTILIZER PRODUCT OPERATION 113 yields the resulting concentrated separator by-product and fish soluble by-product based fertilizer product.

In one embodiment, once the heat treated mixture of concentrated separator by-product and fish soluble by-product is cooled at COOL THE HEAT TREATED MIXTURE OF CONCENTRATED SEPARATOR BY-PRODUCT AND FISH SOLUBLE BY-PRODUCT TO YIELD A CONCENTRATED SEPARATOR BY-PRODUCT AND FISH SOLUBLE BY-PRODUCT FERTILIZER PRODUCT OPERATION 113 to yield the concentrated separator by-product and fish soluble by-product based fertilizer product, process flow proceeds to DELIVER AND/OR APPLY THE CONCENTRATED SEPARATOR BY-PRODUCT AND FISH SOLUBLE BY-PRODUCT FERTILIZER PRODUCT OPERATION 115.

In one embodiment, at DELIVER AND/OR APPLY THE CONCENTRATED SEPARATOR BY-PRODUCT AND FISH SOLUBLE BY-PRODUCT FERTILIZER PRODUCT OPERATION 115 the concentrated separator by-product and fish soluble by-product based fertilizer product is transferred in bulk to a tanker truck and/or disposed into drums for delivery of smaller quantities of the concentrated separator by-product and fish soluble by-product based fertilizer product. In one embodiment, at DELIVER AND/OR APPLY THE CONCENTRATED SEPARATOR BY-PRODUCT AND FISH SOLUBLE BY-PRODUCT FERTILIZER PRODUCT OPERATION 115 the concentrated separator by-product and fish soluble by-product based fertilizer product is then delivered to farms for application to agricultural vegetation.

In one embodiment, at DELIVER AND/OR APPLY THE CONCENTRATED SEPARATOR BY-PRODUCT AND FISH SOLUBLE BY-PRODUCT FERTILIZER PRODUCT OPERATION 115 a quantity of the concentrated separator by-product and fish soluble by-product based fertilizer product is offloaded into plastic field tanks located at or near the application site. In one embodiment, at DELIVER AND/OR APPLY THE CONCENTRATED SEPARATOR BY-PRODUCT AND FISH SOLUBLE BY-PRODUCT FERTILIZER PRODUCT OPERATION 115 the plastic field tanks are then used to feed the resulting concentrated separator by-product and fish soluble by-product based fertilizer product into the irrigation stream either by direct injection or by vacuum drawing from the irrigation flow.

Depending on the particular agricultural vegetation requirements, the application rate of the resulting concentrated separator by-product and fish soluble by-product based fertilizer product at DELIVER AND/OR APPLY THE CONCENTRATED SEPARATOR BY-PRODUCT AND FISH SOLUBLE BY-PRODUCT FERTILIZER PRODUCT OPERATION 115 may be anywhere in a range of approximately 25 to 200 gallons per acre.

In one embodiment, at DELIVER AND/OR APPLY THE CONCENTRATED SEPARATOR BY-PRODUCT AND FISH SOLUBLE BY-PRODUCT FERTILIZER PRODUCT OPERATION 115 the resulting concentrated separator by-product and fish soluble by-product based fertilizer product may also be directly sprayed onto the agricultural vegetation without concerns of plant burning as may occur with more concentrated inorganic fertilizers.

In one embodiment, once the concentrated separator by-product and fish soluble by-product based fertilizer product is delivered and applied at DELIVER AND/OR APPLY THE CONCENTRATED SEPARATOR BY-PRODUCT AND FISH SOLUBLE BY-PRODUCT FERTILIZER PRODUCT OPERATION 115, process flow proceeds to EXIT OPERATION 130 and process for creating a concentrated separator by-product and fish soluble by-product based fertilizer product 100 is exited.

Using process for production of a concentrated separator by-product and fish soluble by-product based fertilizer product 100, a concentrated separator by-product and fish soluble by-product based fertilizer product is provided that: is environmentally benign; is non-pathogenic; is derived from natural organic sources; does not require significant processing; has minimal odor; has a low viscosity liquid form; can be applied directly to agricultural vegetation; can be injected and/or added into irrigation streams; includes time-released nitrogen components which become bioavailable to agricultural vegetation by beneficial microbial digestion in soil; and eliminates chemical crop burning.

It should be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In the discussion above, certain aspects of one embodiment include process steps and/or operations described herein for illustrative purposes in a particular order and/or grouping. However, the particular order and/or grouping shown and discussed herein are illustrative only and not limiting. Those of skill in the art will recognize that other orders and/or grouping of the process steps and/or operations are possible and, in some embodiments, one or more of the process steps and/or operations discussed above can be combined and/or deleted. In addition, portions of one or more of the process steps and/or operations can be re-grouped as portions of one or more other of the process steps and/or operations discussed herein. Consequently, the particular order and/or grouping of the process steps and/or operations discussed herein do not limit the scope of the invention as claimed below.

In addition, the operations shown in the FIGURE are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A process of manufacturing a concentrated separator by-product and fish soluble by-product based fertilizer product comprising:
    obtaining a quantity of concentrated separator by-product (CSB), wherein the CSB is a by-product of a process for the de-sugaring of beet molasses;
    obtaining a quantity of fish soluble by-product, a nontreated by-product of the production of fish meal, wherein nontreated indicates a lack of treatment by enzymes;
    mixing at least part of the quantity of concentrated separator by-product and at least part of the quantity of fish soluble by-product to yield a raw mixture of concentrated separator by-product and fish soluble by-product;
    heat treating the raw mixture of concentrated separator by-product and fish soluble by-product to yield a heat treated mixture of concentrated separator by-product and fish soluble by-product; and
    cooling the heat treated mixture of concentrated separator by-product and fish soluble by-product to yield the concentrated separator by-product and fish soluble by-product based fertilizer product.

2. The process of manufacturing a concentrated separator by-product and fish soluble by-product based fertilizer product of claim 1, wherein;
    mixing at least part of the quantity of concentrated separator by-product and at least part of the quantity of fish soluble by-product to yield a raw mixture of concentrated separator by-product and fish soluble by-product comprises mixing at least part of the quantity of concentrated separator by-product and at least part of the quantity of fish soluble by-product to yield a raw mixture of concentrated separator by-product and fish soluble by-product that is 20% to 30% fish soluble by-product.

3. The process of manufacturing a concentrated separator by-product and fish soluble by-product based fertilizer product of claim 1, wherein;
    mixing at least part of the quantity of concentrated separator by-product and at least part of the quantity of fish soluble by-product to yield a raw mixture of concentrated separator by-product and fish soluble by-product comprises mixing at least part of the quantity of concentrated separator by-product and at least part of the quantity of fish soluble by-product to yield a raw mixture of concentrated separator by-product and fish soluble by-product that is 40% to 60% fish soluble by-product.

4. The process of manufacturing a concentrated separator by-product and fish soluble by-product based fertilizer product of claim 1, wherein;
    heat treating the raw mixture of concentrated separator by-product and fish soluble by-product to yield a heat treated mixture of concentrated separator by-product and fish soluble by-product comprises heating the raw mixture of concentrated separator by-product and fish soluble by-product to 150 degrees F. for at least 24 hours.

5. The process of manufacturing a concentrated separator by-product and fish soluble by-product based fertilizer product of claim 1, wherein;
    heat treating the raw mixture of concentrated separator by-product and fish soluble by-product to yield a heat treated mixture of concentrated separator by-product and fish soluble by-product comprises heating the raw mixture of concentrated separator by-product and fish soluble by-product to a range of about 150 to 250 degrees F. for 24 to 96 hours.

6. The process of manufacturing a concentrated separator by-product and fish soluble by-product based fertilizer product of claim 1, further comprising:
   filtering the quantity of raw mixture of concentrated separator by-product and fish soluble by-product using a filter having a standard wire mesh size number of 100.

7. The process of manufacturing a concentrated separator by-product and fish soluble by-product based fertilizer product of claim 1, further comprising:
   filtering the quantity of raw mixture of concentrated separator by-product and fish soluble by-product using a filter having a standard wire mesh size number in a range of 50 to 200.

8. The process of manufacturing a concentrated separator by-product and fish soluble by-product based fertilizer product of claim 1, further comprising:
   filtering the quantity of heat treated mixture of concentrated separator by-product and fish soluble by-product using a filter having a standard wire mesh size number of 100.

9. The process of manufacturing a concentrated separator by-product and fish soluble by-product based fertilizer product of claim 1, further comprising:
   filtering the quantity of heat treated mixture of concentrated separator by-product and fish soluble by-product using a filter having a standard wire mesh size number in a range of 50 to 200.

10. The process of manufacturing a concentrated separator by-product and fish soluble by-product based fertilizer product of claim 1, further comprising:
    blending the heat treated mixture of concentrated separator by-product and fish soluble by-product with a liquid to achieve a solution of heat treated mixture of concentrated separator by-product and fish soluble by-product and the liquid having a specific gravity in a range of 1.2 to 1.6.

11. The process of manufacturing a concentrated separator by-product and fish soluble by-product based fertilizer product of claim 1, wherein;
    the concentrated separator by-product and fish soluble by-product based fertilizer product has less than 75% dry matter.

12. The process of manufacturing a concentrated separator by-product and fish soluble by-product based fertilizer product of claim 1, wherein;
    the concentrated separator by-product and fish soluble by-product based fertilizer product includes a nitrogen content in a range of 2 to 3 percent.

13. The process of manufacturing a concentrated separator by-product and fish soluble by-product based fertilizer product of claim 1, wherein;
    the concentrated separator by-product and fish soluble by-product based fertilizer product includes a phosphate content in a range of 0.5 to 2.5 percent.

14. The process of manufacturing a concentrated separator by-product and fish soluble by-product based fertilizer product of claim 1, wherein;
    the concentrated separator by-product and fish soluble by-product based fertilizer product includes a potash content in a range of 2 to 7 percent.

15. A concentrated separator by-product and fish soluble by-product based fertilizer product comprising:
    a heat treated mixture of concentrated separator by-product (CSB) and fish soluble by-product, wherein the CSB is a by-product of a process for the de-sugaring of beet molasses, and the fish soluble by-product is a nontreated by-product of the production of fish meal, wherein nontreated indicates a lack of treatment by enzymes.

16. The concentrated separator by-product and fish soluble by-product based fertilizer product of claim 15, wherein;
    the concentrated separator by-product and fish soluble by-product based fertilizer product is 20% to 30% heat treated fish soluble by-product.

17. The concentrated separator by-product and fish soluble by-product based fertilizer product of claim 15, wherein;
    the concentrated separator by-product and fish soluble by-product based fertilizer product is 40% to 60% heat treated fish soluble by-product.

18. The concentrated separator by-product and fish soluble by-product based fertilizer product of claim 15, wherein;
    the heat treated mixture of concentrated separator by-product and fish soluble by-product is heat treated to 150 degrees F. for at least 24 hours.

19. The concentrated separator by-product and fish soluble by-product based fertilizer product of claim 15, wherein;
    the heat treated mixture of concentrated separator by-product and fish soluble by-product is heat treated to a range of about 150 to 250 degrees F. for 24 to 96 hours.

20. The concentrated separator by-product and fish soluble by-product based fertilizer product of claim 15, wherein;
    the heat treated mixture of concentrated separator by-product and fish soluble by-product has a specific gravity in a range of 1.2 to 1.6.

21. The concentrated separator by-product and fish soluble by-product based fertilizer product of claim 15, wherein;
    the heat treated mixture of concentrated separator by-product and fish soluble by-product has less than 75% dry matter.

22. The concentrated separator by-product and fish soluble by-product based fertilizer product of claim 15, wherein;
    the heat treated mixture of concentrated separator by-product and fish soluble by-product includes a nitrogen content in a range of 2 to 3 percent.

23. The concentrated separator by-product and fish soluble by-product based fertilizer product of claim 15, wherein;
    the heat treated mixture of concentrated separator by-product and fish soluble by-product includes a phosphate content in a range of 0.5 to 2.5 percent.

24. The concentrated separator by-product and fish soluble by-product based fertilizer product of claim 15, wherein;
    the heat treated mixture of concentrated separator by-product and fish soluble by-product includes a potash content in a range of 2 to 7 percent.

25. A process for fertilizing a field comprising:
    obtaining a quantity of concentrated separator by-product (CSB), wherein the CSB is a by-product of a process for the de-sugaring of beet molasses;
    obtaining a quantity of fish soluble by-product, a nontreated by-product of the production of fish meal, wherein nontreated indicates a lack of treatment by enzymes;
    mixing at least part of the quantity of concentrated separator by-product and at least part of the quantity of fish soluble by-product to yield a raw mixture of concentrated separator by-product and fish soluble by-product;
    heat treating the raw mixture of concentrated separator by-product and fish soluble by-product to yield a heat treated mixture of concentrated separator by-product and fish soluble by-product;

cooling the heat treated mixture of concentrated separator by-product and fish soluble by-product to yield the concentrated separator by-product and fish soluble by-product based fertilizer product; and applying the concentrated separator by-product and fish soluble by-product based fertilizer product to agricultural vegetation in the field.

26. The process for fertilizing agricultural vegetation of claim 25, wherein;

mixing at least part of the quantity of concentrated separator by-product and at least part of the quantity of fish soluble by-product to yield a raw mixture of concentrated separator by-product and fish soluble by-product comprises mixing at least part of the quantity of concentrated separator by-product and at least part of the quantity of fish soluble by-product to yield a raw mixture of concentrated separator by-product and fish soluble by-product that is 20% to 30% fish soluble by-product.

27. The process for fertilizing agricultural vegetation of claim 25, wherein;

mixing at least part of the quantity of concentrated separator by-product and at least part of the quantity of fish soluble by-product to yield a raw mixture of concentrated separator by-product and fish soluble by-product comprises mixing at least part of the quantity of concentrated separator by-product and at least part of the quantity of fish soluble by-product to yield a raw mixture of concentrated separator by-product and fish soluble by-product that is 40% to 60% fish soluble by-product.

28. The process for fertilizing agricultural vegetation of claim 25, wherein;

heat treating the raw mixture of concentrated separator by-product and fish soluble by-product to yield a heat treated mixture of concentrated separator by-product and fish soluble by-product comprises heating the raw mixture of concentrated separator by-product and fish soluble by-product to 150 degrees F. for at least 24 hours.

29. The process for fertilizing agricultural vegetation of claim 25, wherein;

heat treating the raw mixture of concentrated separator by-product and fish soluble by-product to yield a heat treated mixture of concentrated separator by-product and fish soluble by-product comprises heating the raw mixture of concentrated separator by-product and fish soluble by-product to a range of about 150 to 250 degrees F. for 24 to 96 hours.

30. The process for fertilizing agricultural vegetation of claim 25, further comprising;

filtering the quantity of raw mixture of concentrated separator by-product and fish soluble by-product using a filter having a standard wire mesh size number of 100.

31. The process for fertilizing agricultural vegetation of claim 25, further comprising;

filtering the quantity of raw mixture of concentrated separator by-product and fish soluble by-product using a filter having a standard wire mesh size number in a range of 50 to 200.

32. The process for fertilizing agricultural vegetation of claim 25, further comprising;

filtering the quantity of heat treated mixture of concentrated separator by-product and fish soluble by-product using a filter having a standard wire mesh size number of 100.

33. The process for fertilizing agricultural vegetation of claim 25, further comprising;

filtering the quantity of heat treated mixture of concentrated separator by-product and fish soluble by-product using a filter having a standard wire mesh size number in a range of 50 to 200.

34. The process for fertilizing agricultural vegetation of claim 25, further comprising;

blending the heat treated mixture of concentrated separator by-product and fish soluble by-product with a liquid to achieve a solution of heat treated mixture of concentrated separator by-product and fish soluble by-product and the liquid having a specific gravity in a range of 1.2 to 1.6.

35. The process for fertilizing agricultural vegetation of claim 25, wherein;

the concentrated separator by-product and fish soluble by-product based fertilizer product has less than 75% dry matter.

36. The process for fertilizing agricultural vegetation of claim 25, wherein;

the concentrated separator by-product and fish soluble by-product based fertilizer product includes a nitrogen content in a range of 2 to 3 percent.

37. The process for fertilizing agricultural vegetation of claim 25, wherein;

the concentrated separator by-product and fish soluble by-product based fertilizer product includes a phosphate content in a range of 0.5 to 2.5 percent.

38. The process for fertilizing agricultural vegetation of claim 25, wherein;

the concentrated separator by-product and fish soluble by-product based fertilizer product includes a potash content in a range of 2 to 7 percent.

39. The process for fertilizing agricultural vegetation of claim 25, wherein;

applying the concentrated separator by-product and fish soluble by-product based fertilizer product to the agricultural vegetation comprises applying the concentrated separator by-product and fish soluble by-product based fertilizer product at a rate of 25 to 200 gallons per acre.

* * * * *